United States Patent [19]

Sato et al.

[11] Patent Number: 4,644,411
[45] Date of Patent: Feb. 17, 1987

[54] IMAGE SENSOR

[75] Inventors: Hajime Sato, Sagamihara; Mamoru Mizuguchi, Kawasaki, both of Japan

[73] Assignee: Kabushiki Kaisha Toshiba, Kawasaki, Japan

[21] Appl. No.: 756,297

[22] Filed: Jul. 18, 1985

[30] Foreign Application Priority Data

Jul. 26, 1984 [JP]  Japan .................................. 59-154011
Feb. 27, 1985 [JP]  Japan .................................. 60-36550

[51] Int. Cl.$^4$ ............................................ H04N 1/028
[52] U.S. Cl. .................................... 358/294; 358/213; 358/288; 358/293; 250/578
[58] Field of Search .............. 358/293, 294, 213, 288; 250/578

[56] References Cited

U.S. PATENT DOCUMENTS

| | | | |
|---|---|---|---|
| 4,149,197 | 4/1979 | Kos | 358/294 |
| 4,409,625 | 10/1983 | Ogasawara | 358/288 |
| 4,567,374 | 1/1986 | Takenouchi | 358/294 |
| 4,571,637 | 2/1986 | Thoone | 358/293 |

FOREIGN PATENT DOCUMENTS 57-109664  7/1982  Japan .
57-129065  8/1982  Japan .

Primary Examiner—Howard W. Britton
Attorney, Agent, or Firm—Cushman, Darby & Cushman

[57] ABSTRACT

An image sensor according to one aspect of the present invention comprises a plurality of linearly arranged line sensors each including a plurality of linearly arranged picture elements acting as photodetecting elements, wherein the photodetecting elements positioned at the ends of the linear arrangement are smaller in width in the direction of the linear arrangement than the photodetecting elements positioned in the central portion.

12 Claims, 9 Drawing Figures

F I G. 7
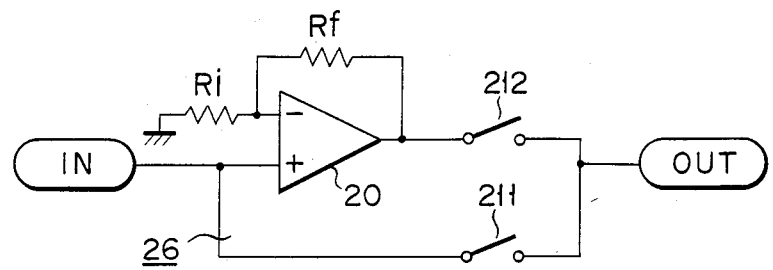
F I G. 8
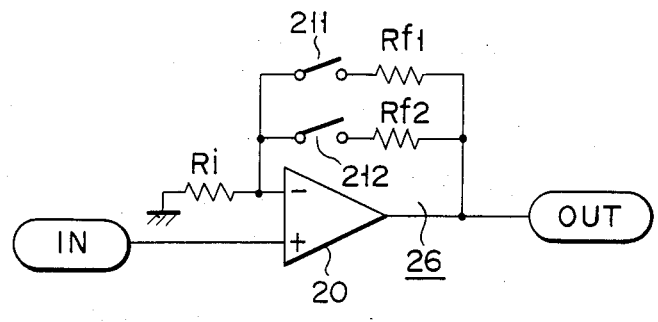
F I G. 9
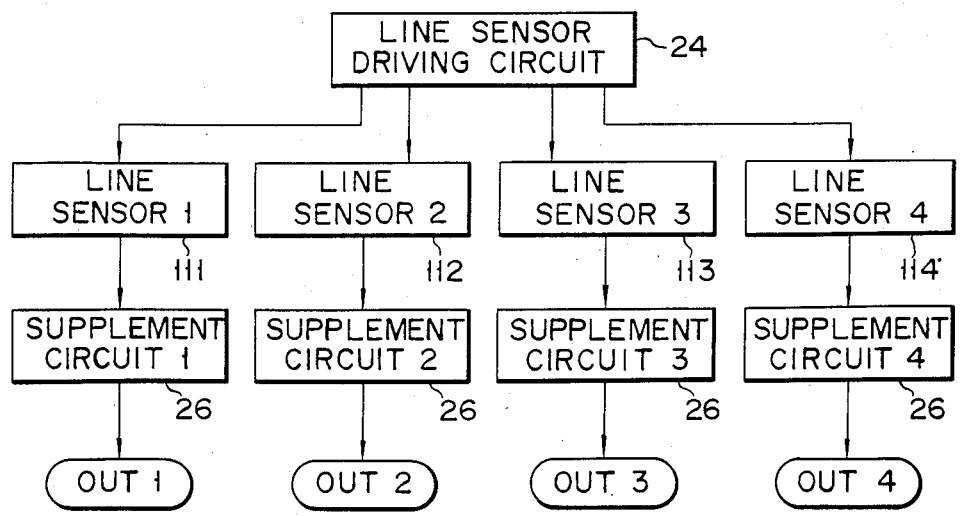

IMAGE SENSOR

BACKGROUND OF THE INVENTION

The present invention relates to an image sensor, and more particularly to an image sensor formed of a line sensor such as a CCD (Charge Coupled Device) sensor, suitable for reading an original in facsimile.

Recently, a line (image) sensor formed of an IC sensor, e.g., a CCD sensor consisting of a plurality of photodetecting elements (picture elements) such as photodiodes linearly arranged in a semiconductor substrate, has been used as an image sensor for reading originals in facsimile. A CCD sensor of this type is formed by applying, for example, a photoetching process to a silicon wafer, followed by cutting the wafer into pellets of a prescribed shape. The length of the sensor in the main scanning direction in the reading step is restricted by the wafer size. It follows that it is necessary to use a magnifying or reducing optical lens system in order to use a single CCD sensor (line sensor) for achieving a magnified or reduced reading of the ordinary original of A4 size, B4 size, etc.

In order to achieve a magnified or reduced reading of the original without using a magnifying or reducing optical lens system, it is necessary to use an image sensor device formed of a plurality of, e.g., 3 to 5, CCD sensors arranged such that the image sensor device has a length equal to that of the original. In this case, the CCD sensors are generally arranged linearly. Where the CCD sensors are linearly arranged, however, a remarkable problem takes place. Specifically, in accordance with an increase in the density of the picture elements, the irregularity in the cut plane at the edge of the CCD sensor is made noticeable relative to the size of the picture element, with the result that no picture element is provided in some of the junctions between the adjacent CCD sensors. In other words, the image sensing device tends to be incapable of reading a character or the like at some of the junctions between the adjacent CCD sensors. In fact, the pitch of the picture elements is 62.5 $\mu$m, if the density of the picture elements is 16 pl (picture elements/mm.) It is unavoidable, however, for the slicing machine, generally used to provide about 10 $\mu$m of the minimum irregularity of the cut plane of the CCD sensor. In addition, it is necessary to allow for 20–30 $\mu$m of defective region, including the irregularity mentioned above. It follows that it is impossible to form a row of picture elements having a constant width of 58.5 $\mu$m within the pitch of 62.5 $\mu$m mentioned above. In other words, at least one picture element is unavoidably omitted in the junction between the adjacent CCD sensors.

To overcome the above-noted defect, the idea of arranging a plurality of sensors in a zig-zag fashion to form two rows of sensors is disclosed in, for example, FIG. 3 of Japanese Patent Disclosure (Kokai) No. 57-109664 and in Japanese Patent Disclosure (Kokai) No. 57-129065. In these cases, however, the CCD sensors included in one row differ from those included in the other row in the reading position of the original in the subscanning direction. In order to obtain output signals aligned in the subscanning direction, it is necessary to provide a line memory in the latter stage of the sensor portion. In addition, it is necessary to eliminate the overlapping in the junction portion of the CCD sensors in order to obtain signals serially aligned in the main scanning direction, leading to a complex control circuit. In conclusion, the system of arranging CCD sensors in a zig-zag fashion leads to a complex mechanism of the reading apparatus.

The omission of the picture element derived from the irregularity in the cut plane of the CCD sensor also remains unsolved in the case where a magnified or reduced reading of the original is performed with a magnifying or reducing optical lens system interposed between at least one CCD sensor and the original. Specifically, the photodetection element in at least one of the front and rear edges of the single CCD sensor, is adversely affected by the defective region, i.e., a picture element-nonforming region, including the irregularity of the cut plane, resulting in failure to form the picture element at said region.

SUMMARY OF THE INVENTION

An object of the present invention is to provide a new and improved image sensor which makes it possible to prevent the picture signal output being adversely affected by the defective region, i.e., a picture image-non-forming region, including the irregularity of the cut plane at the edge of a line sensor. Resultantly, the quality of the picture signal output is prevented from being lowered. In addition, the image sensor of the present invention is simple in construction and can be miniaturized.

According to the present invention, there is provided an image sensor comprising a plurality of linearly arranged line sensors, each including a plurality of linearly arranged picture elements acting as photodetecting elements, wherein the photodetecting elements positioned at the ends of the linear arrangement are smaller in width in the direction of the linear arrangement than the photodetecting elements positioned in the central portion.

BRIEF DESCRIPTION OF THE DRAWINGS

FIG. 7 is a circuit diagram showing a compensation circuit according to one embodiment of the present invention, which is used in the image sensor shown in FIG. 5;

FIG. 8 is a circuit diagram showing a compensation circuit according to another embodiment of the present invention, which is used in the image sensor shown in FIG. 5; and FIG. 9 is a block diagram of an image sensor according to a fourth embodiment of the present invention.

DETAILED DESCRIPTION OF THE PREFERRED EMBODIMENTS

Figure 1:
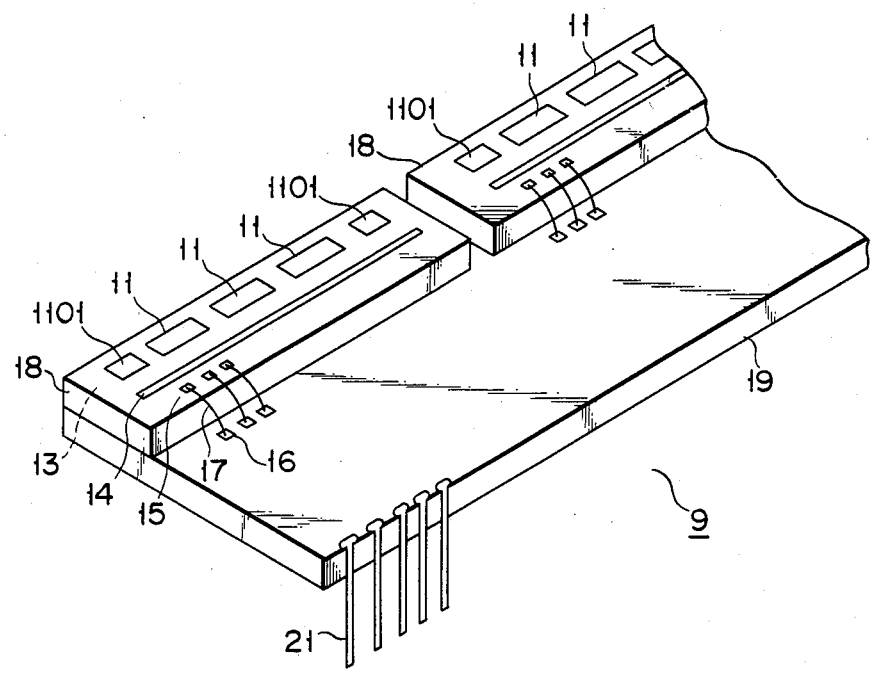
FIG. 1 is a perspective view, partly broken away, of an image sensor according to a first embodiment of the present invention.
Figure 2:
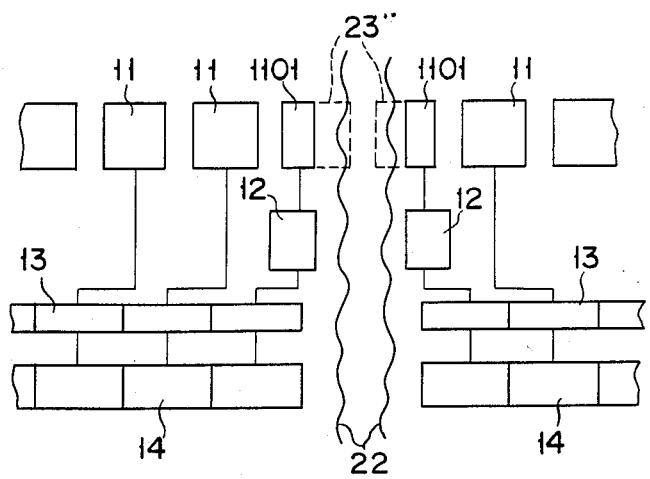
FIG. 2 is a block diagram schematically showing the line sensor included in the embodiment of FIG. 1.
Figure 3:
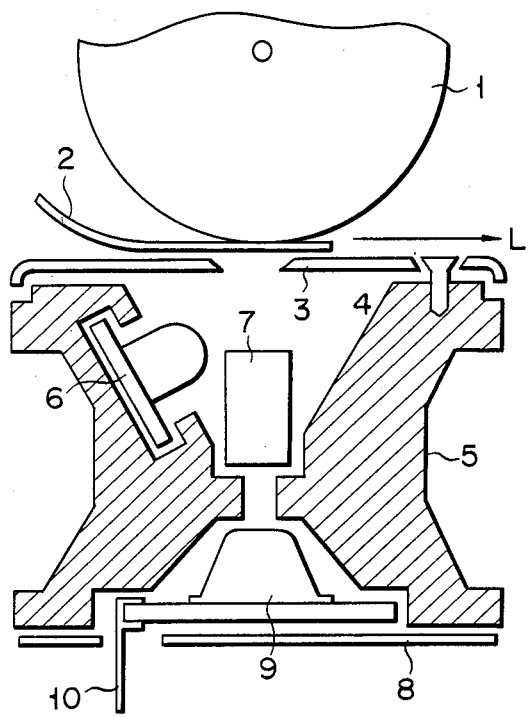
FIG. 3 is a cross sectional view schematically showing an apparatus having the image sensor of FIG. 1 mounted therein.

FIGS. 1 and 2 collectively show an image sensor according to a first embodiment of the present invention, with FIG. 3 showing that the image sensor is mounted on a facsimile.

As seen from FIG. 3, an original paper 2 is moved along a paper guide 3 in the subscanning direction L by a platen roller 1. The picture image written in the original paper 2 is irradiated with light emitted from a light-emitting portion 6 fixed to a support body 5. The light is reflected from the picture image on the original paper 2 and passes through a rod lens array 7 fixed to the support body 5 so as to be converged, or to form a picture image, on a line sensor which consists of CCD sensors and an image sensor 9 which is fixed to the support body 5 by a lid 8 on the back side. The picture image formed on the line sensor is converted into an electric signal, which is delivered through an output terminal 10.

As seen from FIGS. 1 and 2, the image sensor 9 comprises a plurality of line sensors 18 linearly arranged on one side of an alumina substrate 19. In general, 3–5 line sensors, each formed of a CCD sensor, are linearly arranged on the substrate 19. A thick multi-wiring layer (not shown) is formed on one main surface of the substrate 19, with said wiring layer being covered with a black insulating layer (not shown) serving to prevent light reflection. Also, a plurality of lead terminals 21 connected to a treating circuit, (not shown) including the external power source, are arranged on the other side of the alumina substrate 19. Each of the lead terminals 21 corresponds to the output terminal 10 shown in FIG. 3.

Conversely, the line sensor 18 consists of an IC sensor, e.g., a CCD sensor formed by linearly arranging a plurality of photodetecting elements in a semiconductor substrate, e.g., a silicon wafer, followed by cutting the wafer into pellets of a prescribed shape. The photodetecting elements mentioned are linearly arranged in the substrate by means of a photoetching process. It should be noted that a shift gate 13, a CCD register 14 and a bonding pad 15 are formed integrally in the process of preparing the line sensor 18.

The line sensor 18 comprises picture elements 1101 acting as photodetecting elements and picture elements 11 which also act as photodetecting elements. These picture elements 1101 and 11 are linearly arranged and with elements 1101 positioned at the ends. As seen from FIG. 1, the picture element 1101 is one-half as wide as the picture element 11. As described previously, the ordinary line sensor comprises about 20 to 30 μm of defective region at the edge portion including about 10 μm of the irregularity in the cut plane. Where the pitch of picture elements is 62.5 μm and the picture element 11 is 58.5 μm wide, it is most effective to set the width of the picture element 1101 at about 30 μm, which is about half the width of the element 11, in order to allow the picture element 1101 to be positioned closest to the edge so as to avoid the defective region mentioned above.

The signal produced from the picture element 11 is supplied to the CCD register 14 via the shift gate 13. The signals produced by the picture elements are proportional in intensity to the areas thereof. It follows that the intensity of the signal produced from the element 1101 at the end is half the level of the signal produced from the element 11 positioned in the central portion. Thus, an amplifier 12 having a gain of 2 is interposed between the picture element 1101 and the shift gate 13 so as to make the level of the signal supplied to the shift gate 13, via the amplifier 12, equal to that of the signal which is directly supplied from the element 11 to the shift gate 13. The output signal of the line sensor, which is generated from the CCD register 14, is supplied to a bonding pad 16 electrically connected to the thick multi-wiring layer (not shown) via a bonding wire 17 connected to a bonding pad 15. The signal supplied to the bonding pad 16 is generated from the lead terminal 21 through the thick multi-wiring layer.

Incidentally, the reference numeral 22 shown in FIG. 2 denotes the irregularity in the cut plane of the line sensor 18, with the reference numeral 23 denoting the original size of the picture element 1101. As described previously, the actual width of the picture element 1101 positioned at the end is half the width of the element 11 positioned in the central portion. It follows that the elements 1101, having a smaller width, are prevented from being positioned in the defective region, including the irregularity 22 in the cut portion of the line sensor 18, as apparent from FIG. 2. The particular construction described above permits the image sensor 9 to be miniaturized, compared with the conventional image sensor in which line sensors are arranged in a zig-zag fashion, the overlapping portion of the line sensors leading to an increase in the width of the conventional image sensor. Needless to say, the line sensors 18 may be directly joined to the alumina substrate 19 without using an adhesive in the first embodiment of the present invention described above.

Figure 4:
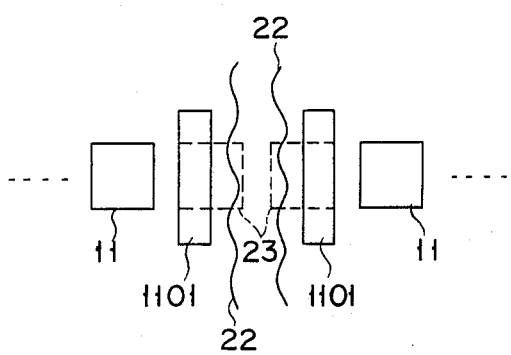
FIG. 4 is a block diagram schematically showing an image sensor according to a second embodiment of the present invention.

FIG. 4 shows a second embodiment of the present invention. This embodiment is equal to the first embodiment, except that, in the second embodiment, the picture element 1101 positioned at the end is equal in area to the element 11 positioned in the central portion, though the width of the element 1101 is half the width of the element 11. Of course, the width of the element 1101 in the subscanning direction is twice the width of the element 11 positioned in the central portion. Since the elements 1101 and 11 have the same area as mentioned above, the amplifier 12 shown in FIG. 2 need not be used in the second embodiment shown in FIG. 4. Needless to say, the element 1101, positioned at the end, may be shaped optionally as long as the width of the element 1101 in the main scanning direction is half the width of the element 11 and equal in area to the element 11.

As apparent from the above description, a magnifying or reducing optical lens system need not be used in the image sensor according to the first or second embodiment of the present invention.

To reiterate, the image sensor according to the first or second embodiment of the present invention comprises a plurality of linearly arranged line sensors, each including a plurality of linearly arranged picture elements. What should be noted is that the picture elements positioned at the ends of the linear arrangement are made smaller in width in the main scanning direction than the picture elements positioned in the central portion. It follows that it is possible to prevent the omission of the picture element in the junction between two adjacent line sensors, leading to an improved picture image quality of the image sensor.

Figure 5:
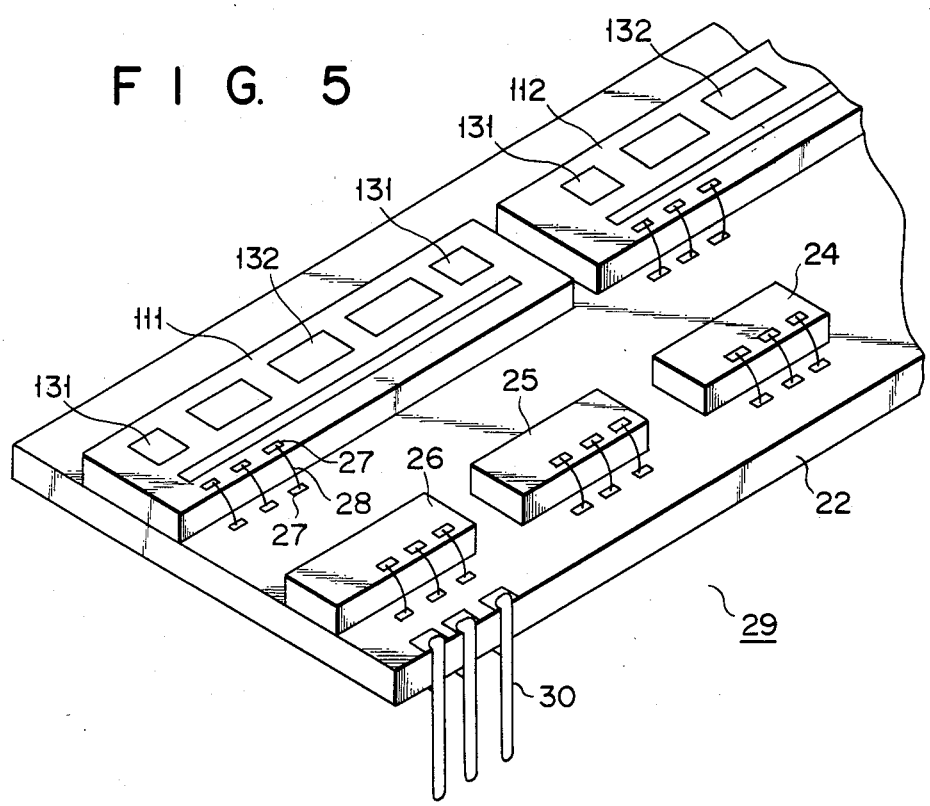
FIG. 5 is a perspective view, partly broken away, schematically showing an image sensor according to a third embodiment of the present invention.
Figure 6:
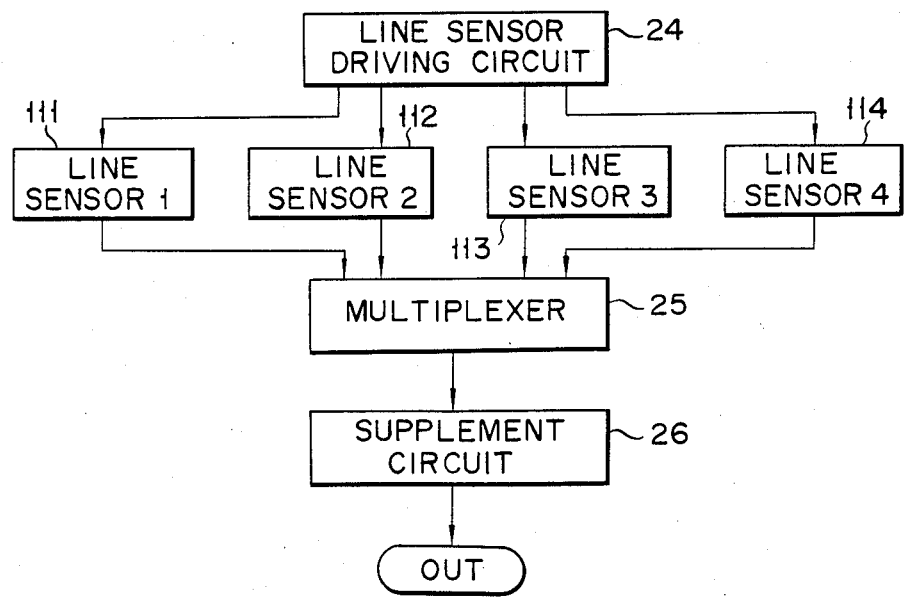
FIG. 6 is a block diagram showing the construction of the image sensor shown in FIG. 5.

FIGS. 5 and 6 collectively show an image sensor 29 according to a third embodiment of the present invention. In this embodiment, line sensors 111, 112, 113 and 114, each formed of a CCD as in the first embodiment, are linearly arranged on an alumina substrate 22. Also, a plurality of picture elements 131, 132 are linearly arranged on each of the line sensors. As seen from the drawing, the picture elements 131, positioned at the ends of the linear arrangement, are smaller in width in the main scanning direction than the elements 132 positioned in the central portion. Specifically, the width of the element 131 is half the width of the element 132 as in the first embodiment.

It is seen that a line sensor driving circuit 24, a multiplexer 25, a supplement circuit 26 and input-output terminals 30 are also mounted on the alumina substrate 22. These members are electrically connected to each other via, for example, a thick multi-wiring layer (not shown), bonding pads 27 and bonding wires 28. Also, the thick multi-wiring layer is covered with a black insulating layer (not shown) serving to prevent light reflection.

The optical signals stored in each of the picture elements 131, 132 included in each of the line sensors 111, 112, 113, 114 are successively generated from these line sensors by the operation of the line sensor driving circuit 24. The signals generated from these line sensors are supplied to the multiplexer 25 so as to form a series of signals. It should be noted that the signals generated from the picture elements 131 positioned at the ends are selectively supplied to the supplement circuit 26, serving to double the intensity (or level) of the signal. It follows that the output signals generated from the picture elements 131, 132, having a different width in the main scanning direction, are capable of the same level, as in the first embodiment. Of course, omission of the picture element in the junction between two adjacent line sensors can be prevented in the third embodiment shown in FIG. 5, because the width of the picture element 131, positioned at the end, is half the width of the element 132, positioned in the central portion as in the first embodiment.

FIGS. 7 and 8 show different embodiments of the supplement circuit 26 used in the embodiment shown in FIG. 5. In the embodiment of FIG. 7, the supplement circuit 26 comprises an amplifier 20 and two analog switches 211, 212. As seen from the drawing, resistors Rf and Ri are connected to the amplifier 20 to enable the level of the signal passing through the amplifier 20 to be doubled. In general, the first analog switch 211 is kept closed, with the second analog switch 212 left open. However, the second analog switch 212 is closed with the first analog switch 211 is left open, but only when the signal generated from the picture element 131, having a smaller width, is supplied to the input terminal IN. It follows that the level of the output signal generated from the picture element 131 mentioned above is selectively doubled by the amplifier 20.

In the embodiment of FIG. 8, resistors Ri, Rf1 and Rf2 are included in the supplement circuit 26 in addition to the amplifier 20, and the analog switches 211, 212 used in the embodiment of FIG. 7. It is important to note that the amplification factor of the amplifier 20 can be changed in the embodiment of FIG. 8 by selectively closing the analog switches 211, 212. Spcifically, the ratio of $(Ri+Rf1)/Ri:(Ri+Rf2)/Ri$ is set at 1:2. In general, the first analog switch 211 is kept closed, with the second analog switch 212 left open. However, the second analog switch 212 is closed when the first analog switch is left open, but only when the signal generated from the picture element 131, having a smaller width, is supplied to the input terminal IN. It follows that the level of the output signal generated from the picture element 131 can be selectively doubled so as to make the output signals generated from the output terminal OUT equal to each other in level with respect to all the signals generated from the picture elements 131 and 132. In addition, the signals generated from the picture elements 132, positioned in the central portion, can also be amplified to a prescribed level. In other words, the supplement circuit 26 shown in FIG. 8 has an amplification factor of $(Ri+Rf1)/Ri$. Further, the impedance of the output signal can be made constant by using the output signal of a single amplifier.

In the third embodiment shown in FIG. 5, the width of the picture elements 131, positioned at the ends of each of the line sensors 111, etc., is half the width of the picture elements 132 positioned in the central portion. However, the picture element 131 positioned at the edge of the alumina substrate 22, i.e., the picture element which does not face the picture element 131 included in the adjacent line sensor, may be made equal in width to the element 132 positioned in the central portion. Further, the width of the element 131, positioned at the end, may be made one-third or two-thirds, in place of half, of the width of the element 132. Still further, the element 131, positioned at the end, may be made greater in the subscanning direction, as in the second embodiment shown in FIG. 4 (See the picture element 1101 in FIG. 4).

In the third embodiment of FIG. 5, the line sensor driving circuit 24, the multiplexer 25 and the supplement circuit 26 are actually mounted on the alumina substrate 22. However, a circuit board prepared separately and having these members mounted thereon may be fixed to the alumina substrate 22. Further, the input-output terminals 30 may be replaced by a flexible printed circuit board.

In the embodiment of FIG. 5, the image sensor 29 performs its image sensing function without using a magnifying or reducing optical lens system. However, the image sensor 29 can also be used satisfactorily in a system in which a single line sensor is used together with a magnifying or reducing optical lens system for the image sensing operation.

In the embodiment of FIG. 5, the output signals generated from a plurality of line sensors are converted into signals of a time-divided single row by the multiplexer 25. However, the reading speed can be improved if the output signals of the line sensors are read out simultaneously. FIG. 9 shows a fourth embodiment of the present invention capable of reading out the output signals of the line sensors simultaneously. In this embodiment, each of the line sensors 111, 112, 113 and 114 is separately provided with the supplement circuit 26, with the result that the output signals coming from these line sensors have the same level.

As described above, in detail, the image sensor of the present invention comprises a plurality of linearly arranged line sensors, each comprising a plurality of linearly arranged picture elements acting as photodetection elements. What should be noted is that the picture elements positioned at the ends of the linear arrangement have a width smaller than the width of the picture elements positioned in the central portion, with the result that it is possible to prevent omission of the picture element at the junction between two adjacent line sensors. Also, the particular construction of the present invention makes it possible to avoid the difficulties inherent in the conventional image sensor comprising a plurality of line sensors, such as a low quality picture image and complex construction of the image sensor.

What is claimed is:

1. An image sensor, comprising a plurality of linearly arranged line sensors each including a plurality of linearly arranged picture elements acting as photodetecting elements, wherein the photodetecting elements positioned at the ends of the linear arrangement are smaller in width in the direction of the linear arrangement than the photodetecting elements positioned in the central portion.

2. The image sensor according to claim 1, wherein the supplement means is provided by the construction whereby the photodetection elements at the ends are formed longer in the direction perpendicular to the arranging direction of the photodetection elements to make the photodetection element at the end substantially equal in area to the photodetection element positioned in the central portion.

3. The image sensor according to claim 1, which further comprises a supplement means for making the output signal of the photodetection element positioned at the end of the linear arrangement equal in level to the output signal of the photodetection element positioned in the central portion.

4. The image sensor according to claim 3, which further comprises, together with the supplement means, a means for converting the output signals generated from the photodetection elements into signals of a time-divided single row, said supplement means being connected to the output terminal of said converting means.

5. The image sensor according to claim 4, wherein the supplement means comprises an amplifier and a means for adjusting the gain of the amplifier in at least two stages, said gain adjusting means serving to set the gain of the amplifier at a greater value when the output signal of the photodetection element having a smaller width is amplified by the amplifier, than when the output signal of the photodetection element having a larger width is amplified by the amplifier.

6. The image sensor according to claim 4, wherein the supplement means comprises an amplifier and a switch means, said switch means serving to enable the output signal of the photodetection element having a smaller width to be selectively amplified by said amplifier.

7. The image sensor according to claim 3, wherein the supplement means is an amplifier connected to the photodetection element positioned at the end.

8. The image sensor according to claim 7, wherein the photodetection elements are formed on a single semiconductor substrate.

9. The image sensor according to claim 8, wherein the amplifier is formed, together with the photodetection elements, integrally with the semiconductor substrate.

10. The image sensor according to claim 9, which further comprises a means for converting the output signals of the photodetection elements into signals of a time-divided single row, said supplement means being connected between the photodetection elements of a smaller width and said converting means.

11. An image sensor, comprising a line sensor including a plurality of linearly arranged photodetection elements formed in a semiconductor substrate, wherein at least one of the photodetection elements, positioned at at least one end of the linear arrangement being smaller in width in the arranging direction of the photodetection elements than the other photodetection elements.

12. An image sensor, comprising a plurality of linearly arranged line sensors each including a plurality of linearly arranged photodetection elements, wherein at least one of the photodetection elements, positioned at at least one end of the linear arrangement is smaller in width in the arranging direction of the photodetection elements than the other photodetection elements, and where the line sensors are arranged such that the photodetection elements having a smaller width are allowed to face each other.

* * * * *